(12) United States Patent
Hood et al.

(10) Patent No.: US 8,511,974 B2
(45) Date of Patent: Aug. 20, 2013

(54) CONTROL MECHANISM

(75) Inventors: Ian A. Hood, Derby (GB); Kenneth F. Udall, Ilkeston (GB)

(73) Assignee: Rolls-Royce PLC, London (GB)

( * ) Notice: Subject to any disclaimer, the term of this patent is extended or adjusted under 35 U.S.C. 154(b) by 745 days.

(21) Appl. No.: 12/760,001

(22) Filed: Apr. 14, 2010

(65) Prior Publication Data

US 2010/0278639 A1 Nov. 4, 2010

(30) Foreign Application Priority Data

May 1, 2009 (GB) .................................. 0907461.8

(51) Int. Cl.
*F01D 17/16* (2006.01)
(52) U.S. Cl.
USPC ..................... 415/149.4; 415/149.2; 415/160; 415/162
(58) Field of Classification Search
USPC ................ 415/149.1, 149.2, 149.4, 159–162
See application file for complete search history.

(56) References Cited

U.S. PATENT DOCUMENTS

| | | | |
|---|---|---|---|
| 4,295,784 A | 10/1981 | Manning | |
| 5,692,879 A * | 12/1997 | Charbonnel | 415/159 |
| 6,398,483 B1 * | 6/2002 | Conete et al. | 415/160 |
| 7,871,242 B2 * | 1/2011 | Swanson et al. | 415/160 |
| 2005/0129510 A1 | 6/2005 | Raine et al. | |
| 2005/0254938 A1 * | 11/2005 | Sheath et al. | 415/160 |
| 2006/0263206 A1 | 11/2006 | Bouru | |

FOREIGN PATENT DOCUMENTS

GB 2 164 099 A 3/1986

OTHER PUBLICATIONS

Sep. 1, 2009 Search Report issued in Great Britain Patent Application No. GB0907461.8.

* cited by examiner

*Primary Examiner* — Christopher Verdier
(74) *Attorney, Agent, or Firm* — Oliff & Berridge, PLC

(57) ABSTRACT

A control mechanism is provided for moving at least two components of a gas turbine engine. The control mechanism comprises a movable actuation rod and a first linkage arrangement which includes a first bell crank connecting the actuation rod to a first component. Movement of the actuation rod produces an output motion of the first bell crank which in turn drives movement of the first component. The control mechanism further comprises a second linkage arrangement which includes a second bell crank connecting the actuation rod to a second component. Movement of the actuation rod produces an output motion of the second bell crank which in turn drives movement of the second component. The first and the second linkage arrangements are configure so that over a predetermined range of movement of the actuation rod the first component is moved which the second component is not moved.

9 Claims, 4 Drawing Sheets

CONTROL MECHANISM

The present invention relates to a mechanism for controlling movement of multiple variable components, and in particular, but not exclusively, controlling movement of unison rings which vary the angles of respective rows of vanes of a gas turbine engine.

BACKGROUND

Mechanical linkage arrangements incorporating bell cranks can be used to provide rotational control of annular arrays of vanes in multiple stages in a compressor of a gas turbine engine. Such an arrangement may comprise a bell crank, rotatable about a fulcrum, an actuation rod being pivotably connected to an input arm to the bell crank and a control rod being pivotably connected to an output arm of the bell crank. Movement of the actuation rod rotates the bell crank which in turn causes motion of the control rod. This motion can then be used to drive a unison ring which changes the angles of a row of vanes. Existing linkage arrangements can provide linked behaviour between the different rows of vanes.

SUMMARY

The present invention is at least partly based on the realisation that it would be desirable to introduce a degree of "lost motion" between linkage arrangements sharing the same actuation rod so that different components can be operated at different times or rates.

Thus, a first aspect of the invention provides a control mechanism for moving at least two components of a gas turbine engine, the control mechanism comprising:

a moveable actuation rod, a first linkage arrangement which includes a first bell crank and which operatively connects the actuation rod to a first component of the gas turbine engine such that movement of the actuation rod produces an output motion of the first bell crank which in turn drives movement of the first component, and a second linkage arrangement which includes a second bell crank and which operatively connects the actuation rod to a second component of the gas turbine engine such that movement of the actuation rod produces an output motion of the second bell crank which in turn drives movement of the second component;

wherein the first linkage arrangement and the second linkage arrangement are configured so that over a predetermined range of movement of the actuation rod the first component is moved by the first bell crank while the second component is not moved by the second bell crank. Typically, the first linkage arrangement and the second linkage arrangement are also configured so that over a further range of movement of the actuation rod the first component is moved by the first bell crank while the second component is moved by the second bell crank Thus, advantageously, the lost motion can be produced by linkage arrangements incorporating bell cranks. Such linkage arrangements can be made mechanically reliable and relatively compact and lightweight.

The control mechanism may have any one or any combination of the following optional features.

The first linkage arrangement and the second linkage arrangement may be further configured so that over a second predetermined range of movement of the actuation rod, spaced from the first predetermined range of movement, the first component is moved by the first bell crank while the second component is not moved by the second bell crank. Thus, for example, lost motion can be produced at the beginning and at the end of the stroke of the actuation rod, while in the middle of the stroke both components are moved.

The second linkage arrangement may include a further bell crank operatively connected between the actuation rod and the second bell crank. The respective configurations of the second and further bell cranks and their relative positions can be used to produce the lost motion.

The first bell crank and the further bell crank may be provided by the same bell crank. This can reduce the number of particularly rotating parts, thereby allowing weight-savings and reliability improvements to be achieved.

Preferably, the first and the second components are respective unison rings. Typically, the unison rings vary the angles of respective rows of vanes of the gas turbine engine. For example, the unison ring of the first linkage arrangement can vary the angles of a row of inlet guide vanes and the unison ring of the second linkage arrangement can vary the angles of a row of stator vanes downstream of the inlet guide vanes.

The second linkage arrangement may also operatively connect the actuation rod to a third component of the gas turbine engine such that movement of the actuation rod produces an output motion of the second bell crank which in turn drives movement of the third component, the second linkage arrangement being configured so that over said predetermined range of movement of the actuation rod (and optionally over the second predetermined range of movement of the actuation rod) the third component is not moved by the second bell crank. Typically, the second linkage arrangement is also configured so that over the further range of movement of the actuation rod the third component is moved by the second bell crank. Thus both the second and the third components can experience lost motion.

Preferably, the third component is a third unison ring. Typically, the third unison ring varies the angles of a row of vanes of the gas turbine engine. For example, when the unison ring of the first linkage arrangement varies the angles of a row of inlet guide vanes and the unison ring of the second linkage arrangement varies the angles of a row of stator vanes downstream of the inlet guide vanes more, the third unison ring can vary the angles of a third row of stator vanes also downstream of the inlet guide vanes.

A further aspect of the invention provides a gas turbine engine having the control mechanism of the first aspect, optionally including any one or any combination of the optional features of the control mechanism.

BRIEF DESCRIPTION OF THE DRAWINGS

Embodiments of the invention will now be described by way of example with reference to the accompanying drawings in which.

DETAILED DESCRIPTION OF EMBODIMENTS

Figure 1:
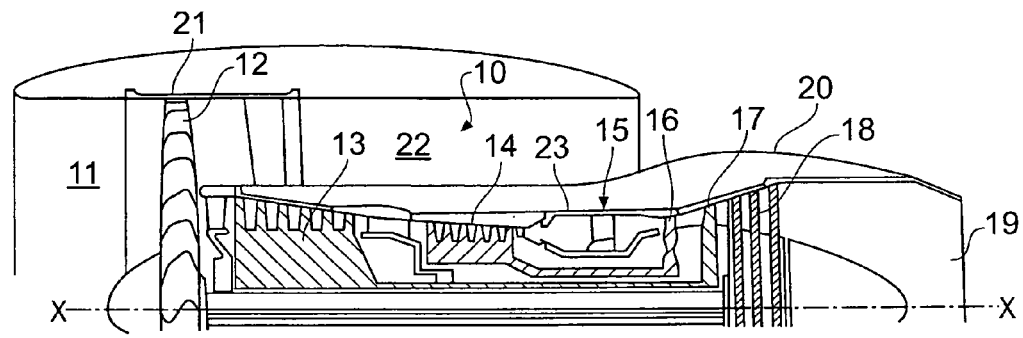
FIG. 1 shows schematically a gas turbine engine.

FIG. 1 shows schematically a gas turbine engine generally indicated at 10 and having a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core exhaust nozzle 19. A nacelle 21 generally surrounds the engine 10 and defines both the intake 11 and a bypass duct 22 which defines a bypass exhaust nozzle 20.

The gas turbine engine 10 works in the conventional manner so that air entering the intake 11 is accelerated by the fan 12 to produce two air flows: a first air flow into the intermediate pressure compressor 13 and a second air flow which passes through the bypass duct 22 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the core nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Figure 2:
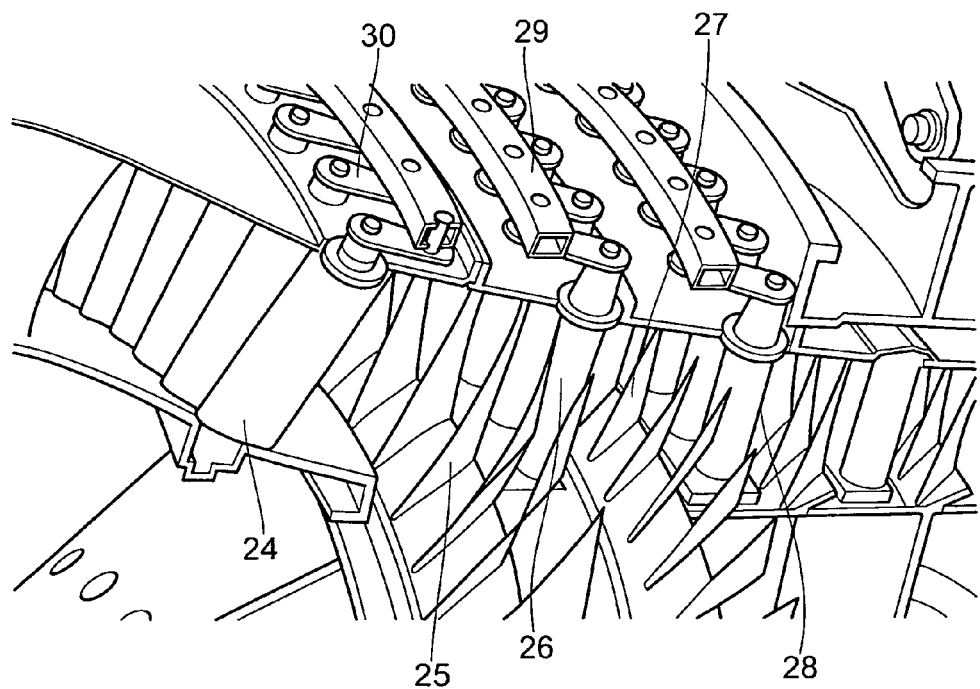
FIG. 2 shows schematically a detailed cut-away view of the intermediate pressure compressor of a gas turbine engine.

FIG. 2 shows detail of an intermediate pressure compressor 13. A row of variable inlet guide vanes (VIGVs) 24 is positioned before the first row of compressor blades 25 of the intermediate pressure compressor. A first row of variable stator vanes (VSV1s) 26 is then positioned behind the first row of compressor blades and before the second row of blades 27, and a second row of variable stator vanes (VSV2s) 28 is positioned behind the second row of blades. When the compressor speed reduces, the axial velocity of the inlet air becomes low relative to the blade speeds. This increases the incidence of the air onto the blades. If the incidence increases too far aerodynamic stall can occur. To overcome this problem, the VIGVs and the VSVs can rotate about their axes, changing the angles of the vanes and thereby altering the incidence of the airflow onto the blades.

The angles of the VIGVs or VSVs of a row are changed by circumferentially rotating a respective unison ring 29, each VIGV or VSV being joined to the unison ring by a respective lever 30. Depending on compressor and engine performance, the unison ring is rotated under the control of an actuator, a linkage arrangement operatively connecting the actuator to the unison ring.

Thus, variable vanes can be used where high pressure ratios are required across a single compressor (e.g. intermediate 13 and/or high 14). As a compressor speed is reduced from its optimal design value the variable vanes are progressively closed to maintain an acceptable gas angle onto the downstream rotor blades. This prevents the compressor 13, 14 from surging, which can result in a loss of engine thrust and damage to turbomachinery.

Existing linkage arrangements provide fixed relationship rotation of each row of vanes 24, 26, 28. However, it is desirable to further control the gas flow to further improve the capability of the compressor to prevent surge, whilst also increasing the flow capacity and efficiency of the compressor.

Figure 3:
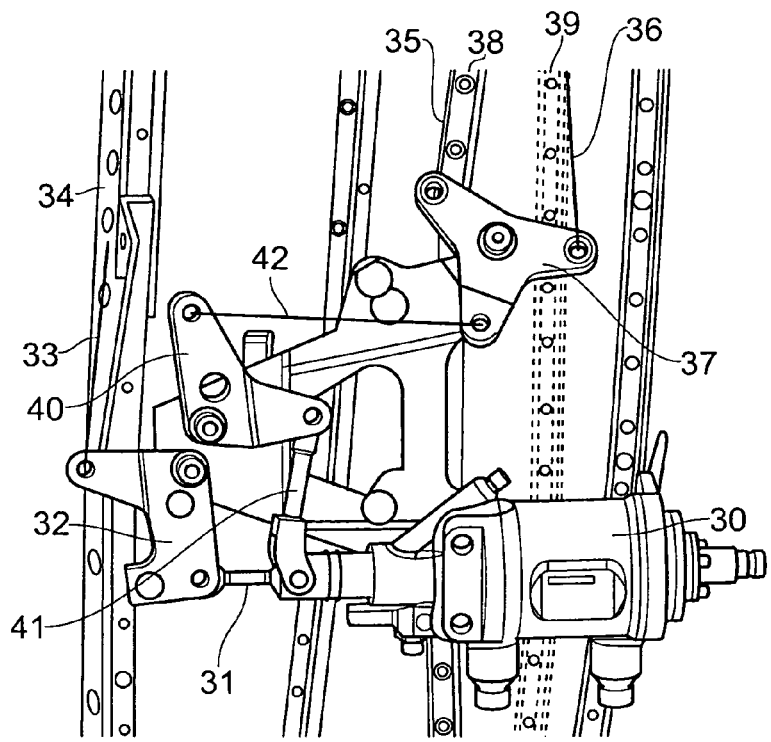
FIG. 3 shows schematically a control mechanism according to a first embodiment of the present invention for operating intermediate compressor unison rings.

FIG. 3 shows a control mechanism according to a first embodiment of the present invention for operating intermediate compressor unison rings. The mechanism comprises a hydraulic actuator 30 (typically using engine fuel as the operating fluid) which drives an actuation rod in its length direction. The distal end of the actuation rod is connected to an input arm of a first bell crank 32. A VIGV control rod 33 extends from an output arm of the bell crank to the VIGV unison ring 34. The bell crank 32 and VIGV control rod 33 define a first linkage arrangement.

In addition, VSV control rods 35, 36 extend from respective output arms of a second bell crank 37, VSV1 control rod 35 connecting to the VSV1 unison ring 38 and VSV2 control rod 35 connecting to the VSV2 unison ring 39 To rotate the second bell crank, a third bell crank 40 is operatively connected between the actuation rod 31 and the second bell crank. A first intermediate control rod 41 is pivotally connected to the proximal end of the actuation rod and extends laterally therefrom to join to an input arm of the third bell crank. A second intermediate control rod 42 then connects an output arm of the third bell crank to an input arm of the second bell crank. The second and third bell cranks 37, 40, first and second intermediate control rods 41, 42, and VSV control rods 35, 36 define a second linkage arrangement.

The linkage arrangements provide a system whereby the VIGVS can be initially closing without any significant movement of the VSVs. For example, movement of the actuation rod 31 at the position shown in FIG. 3 will produce little or no movement of the third bell crank 40. However, when the actuation rod has extended so that the connection between the rod and the first intermediate control rod 41 is further to the left, movement of the actuation rod will cause the VSVs to close together with the VIGV. Thus the linkage arrangements provide an initial predetermined range of movement of the actuation rod over which VIGV unison is rotated while the VSV unison rings are not rotated. This variation in movement between the vanes can provide an efficiency benefit over known systems.

Figure 4:
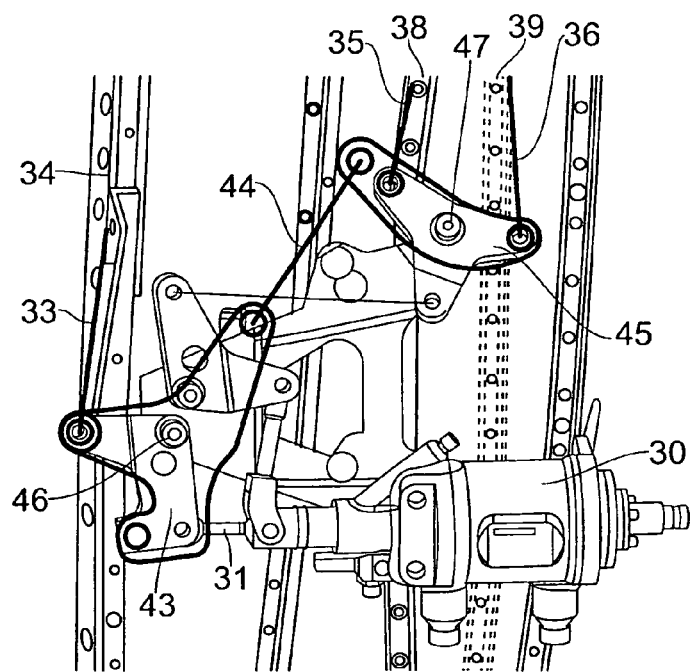
FIG. 4 shows schematically a control mechanism according to a second embodiment of the present invention for operating intermediate compressor unison rings, the actuation rod of the mechanism being at the start of its stroke.

FIG. 4 shows a control mechanism according to a second embodiment of the present invention for operating intermediate compressor unison rings. For ease of comparison, the linkage arrangement components of the second embodiment are drawn with thick lines and overlaid on the control mechanism of the first embodiment. The hydraulic actuator 30, actuation rod 31, VIGV control rod 33, VSV control rods 35, 36, and unison rings 34, 38, 39 are unchanged as between the two embodiments.

In the second embodiment, the first and third bell cranks of the first embodiments are replaced by a single first bell crank 43 having two output arms. One output arm connects to the end of VIGV control rod 33 and thence to the VIGV unison ring 34. An intermediate control rod 44 extends from the other output arm to attach to an arm of second bell crank 45. VSV control rods 35, 36 extend from the second bell crank 45 and thence to the VSV unison rings 38, 39 in a similar manner to the first embodiment. The first bell crank 43 and VIGV control rod 33 define a first linkage arrangement, and the first bell crank 43, intermediate control rod 44, second bell crank 45 and VSV control rods 35, 36 define a second linkage arrangement.

The control system of the second embodiment has one less bell crank and one less control rod compared to the system of the first embodiment. Also, side loads on the actuation rod 31 produced by the first intermediate control rod 41 can be avoided.

At the start of the stroke of the actuation rod 31, the intermediate control rod 44 is aligned with the fulcrum 46 of the first bell crank 43 to achieve lost motion at the second bell crank 45. As the actuation rod extends and the first bell crank rotates clockwise, the intermediate control rod initially turns with limited effect on the second bell crank. However, after a given rotation the crank starts to pull on the second bell crank, rotating it anti-clockwise and driving the VSV control rods 35, 36. The amount of lost motion can be controlled by adjusting the initial angular position of the first bell crank 43.

Figure 5:
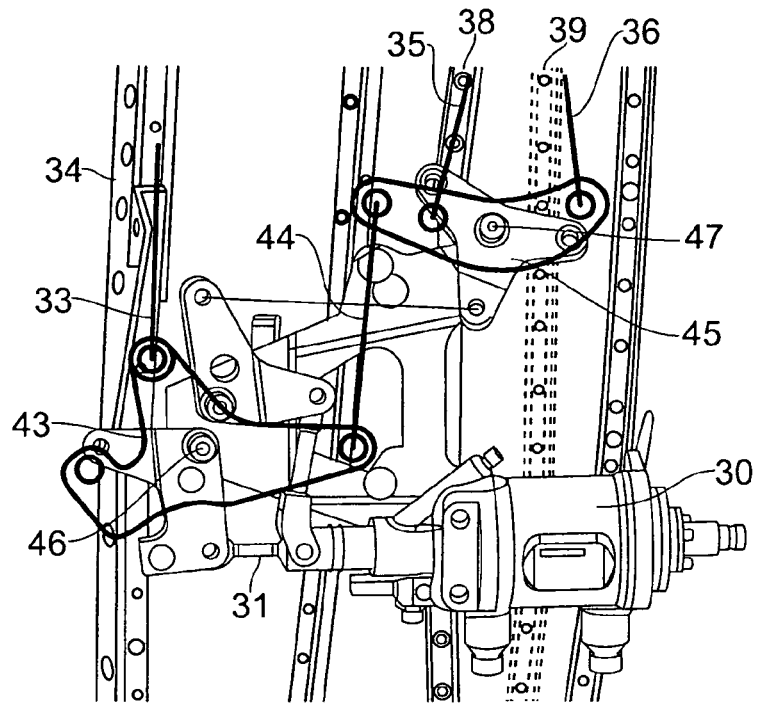
FIG. 5 shows schematically the control mechanism of FIG. 4 with the actuation rod at the end of its stroke.

FIG. 5 shows the control mechanism of the second embodiment at the end of the stroke of the actuation rod 31. The intermediate control rod 44 leading to the second bell crank 45 is being pulled at right angles to the first bell crank fulcrum 46. This means that the rod speed and the speed of actuation of the second bell crank are at a maximum.

It is possible, by changing the configuration of the second bell crank 45, to adjust the relative VSV1 and VSV2 opening and closing speeds. In FIG. 5, for example, the VSV1 control rod 35 has swung just over the right angle to the fulcrum 47 of the second bell crank, so that its motion is gently accelerating with respect to rotation of the second bell crank, then fairly linear. The VSV2 control rod 36, on the other hand, is gently decelerating.

Figure 5A:
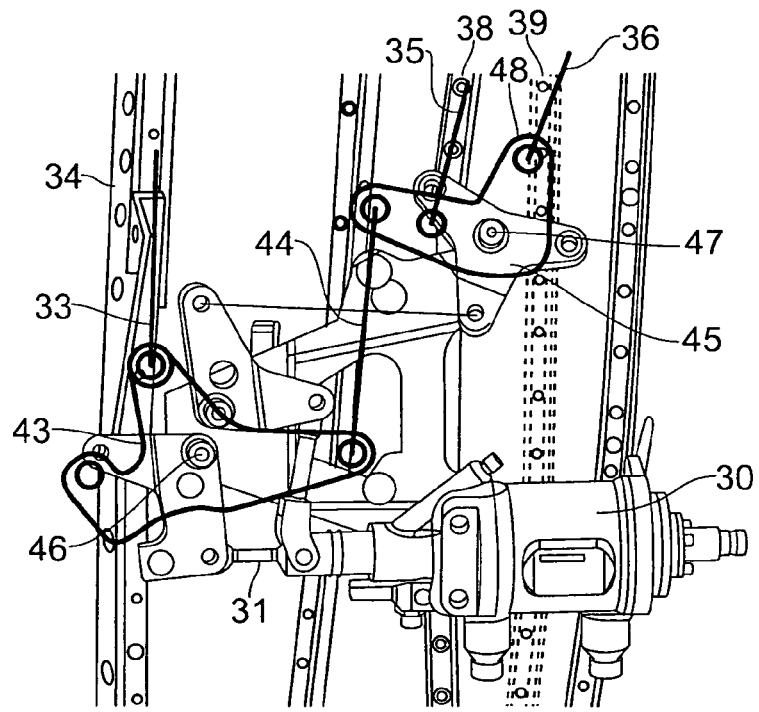
FIG. 5A shows an alternative configuration of the control mechanism.

FIG. 5A is an alternative configuration for driving the VSV2 control rod 36. By increased cranking of the bell crank, lost motion at control rod 36 at the end of the stroke of the actuation rod 31 can be achieved. Mean speed can be maintained by increasing the length of the arm. In a similar fashion, lost motion at VSV1 control rod 35 at the end of the stroke of the actuation rod 31 can also be achieved.

Figure 6:
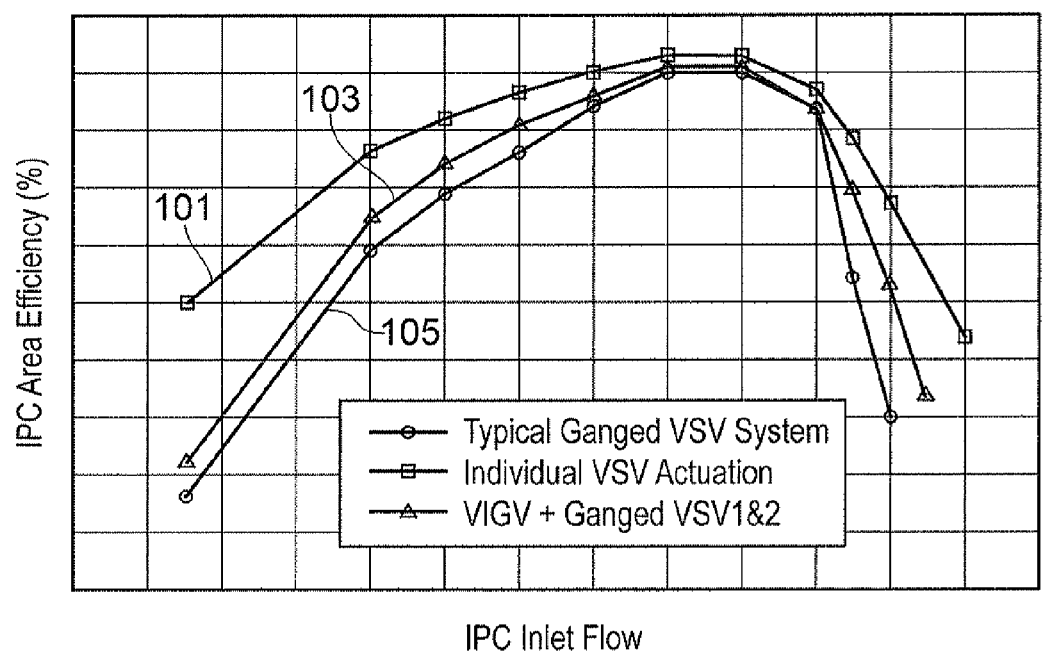
FIG. 6 shows a plot of measured intermediate pressure compressor (IPC) adiabatic efficiency against mass flow (in pounds/second) of the IPC inlet flow for a gas turbine engine.

FIG. 6 shows a plot of measured intermediate pressure compressor (IPC) adiabatic efficiency against flow (in pounds/second) of the IPC inlet flow for a typical gas turbine engine. The upper curve 101 shows the pattern of efficiencies that are achieved when the VIGV, VSV1 and VSV2 rows are independently actuated. The lower curve 105 shows the pattern of the pattern of efficiencies that are achieved when the VIGV, VSV1 and VSV2 rows are actuated in a conventional ganged arrangement (i.e. without lost motion). The middle curve 103 shows the effect of actuating the VIGV row semi-independently of the VSV1 and VSV2 rows, i.e. so that when reducing from a mid flow to a low flow regime initially all the rows close but then only the VIGV row closes, and when increasing from a mid flow to a high flow regime initially all the rows open but then only the VIGV row opens. This semi-independent operation of the VIGV row from the VSV1 and VSV2 rows is achievable using control mechanisms according to the present invention.

Advantageously, although the efficiencies are lower than can be achieved when the VIGV, VSV1 and VSV2 rows are independently actuated, a significant improvement relative to conventional ganged arrangements is achieved. Further the improvement can be obtained without introducing overly complex mechanical linkages. Also the control mechanisms of the present invention require little headroom, making them suitable for use where in situations where there are space restrictions. A further advantage of the control mechanisms is that they can be used in situations where there is a high hale angle (i.e. a high angle of taper of the compressor).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A control mechanism for moving at least two components of a gas turbine engine, the control mechanism comprising:
   a moveable actuation rod,
   a first linkage arrangement which includes a first bell crank, wherein the first linkage arrangement operatively connects the actuation rod to a first component of the gas turbine engine such that movement of the actuation rod produces an output motion of the first bell crank which in turn drives movement of the first component, and
   a second linkage arrangement which includes a second bell crank, wherein the second linkage arrangement operatively connects the actuation rod to a second component of the gas turbine engine such that movement of the actuation rod produces an output motion of the second bell crank which in turn drives movement of the second component;
   wherein the first linkage arrangement and the second linkage arrangement are configured so that over a predetermined range of movement of the actuation rod the first component is moved by the first bell crank while the second component is not moved by the second bell crank, and
   wherein the first and second components are respective unison rings.

2. A control mechanism according to claim 1, wherein the first linkage arrangement and the second linkage arrangement are further configured so that over a second spaced predetermined range of movement of the actuation rod the first component is moved by the first bell crank while the second component is not moved by the second bell crank.

3. A control mechanism according to claim 1, wherein the second linkage arrangement includes a further bell crank operatively connected between the actuation rod and the second bell crank.

4. A control mechanism according to claim 3, wherein the first bell crank, the second linkage arrangement and the further bell crank are provided as a unitary body.

5. A control mechanism according to claim 1, wherein the unison rings vary the angles of respective rows of vanes of the gas turbine engine.

6. A control mechanism according to claim 5, wherein the unison ring of the first linkage arrangement varies the angles of a row of inlet guide vanes and the unison ring of the second linkage arrangement varies the angles of a row of stator vanes downstream of the inlet guide vanes.

7. A control mechanism according to claim 1, wherein the second linkage arrangement also operatively connects the actuation rod to a third component of the gas turbine engine such that movement of the actuation rod produces an output motion of the second bell crank which in turn drives movement of the third component, the second linkage arrangement being configured so that over said predetermined range of movement of the actuation rod the third component is not moved by the second bell crank.

8. A control mechanism according to claim 7, wherein the third component is a third unison ring.

9. A gas turbine engine having the control mechanism of claim 1.

* * * * *